United States Patent
Brumback et al.

(10) Patent No.: US 8,732,456 B2
(45) Date of Patent: May 20, 2014

(54) ENTERPRISE ENVIRONMENT DISK ENCRYPTION

(75) Inventors: Ryan Brumback, Cincinnati, OH (US); Doug Ralph Witter, Cincinatti, OH (US); Thomas DeBoever, Van Buren Township, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/446,714

(22) Filed: Apr. 13, 2012

(65) Prior Publication Data
US 2013/0275747 A1    Oct. 17, 2013

(51) Int. Cl.
*H04L 29/06*    (2006.01)
(52) U.S. Cl.
USPC ............................................ 713/155
(58) Field of Classification Search
None
See application file for complete search history.

(56) References Cited

U.S. PATENT DOCUMENTS

| | | | |
|---|---|---|---|
| 2002/0133396 A1* | 9/2002 | Barnhart | 705/12 |
| 2011/0246773 A1* | 10/2011 | Sidle et al. | 713/168 |
| 2012/0017271 A1* | 1/2012 | Smith et al. | 726/19 |

* cited by examiner

*Primary Examiner* — Brandon Hoffman
(74) *Attorney, Agent, or Firm* — Jean Testa; Fletecher Yoder

(57) ABSTRACT

A method for deploying a disk encryption password to a client computer includes installing a disk encryption agent on a client computer, where the agent communicates with an enterprise encryption service that encrypts a disk password using a public key generated at the client computer. The encrypted disk password is transmitted to the client computer where it is set as the current disk password. A system to deploy a disk encryption password includes one or more client computers and at least one server having a control processor configured to support operation of an enterprise encryption service. The encryption service is configured to install a disk encryption agent on a client computer and generate an encrypted disk password using a public key generated by the client computer. An enterprise encryption database in communication with the enterprise encryption service stores the disk password.

20 Claims, 6 Drawing Sheets

DISK ENCRYPTION CONSOLE

APPLICATION MENU

▸ MENU
- MANAGE USERS
- MANAGE GROUPS
- ASSIGN USERS
- ASSIGN PERMISSIONS
- CONSOLE LOGS
- DISK PASSWORD
- DISK ENCRYPTION LOGS

605

USERNAME
LOG OUT

WEB CONSOLE | DISK PASSWORD

BUSINESS: [AVIATION ▾]   OWNER SSO:
SUB BUSINESS: [    ]     FIRST NAME: [    ]
SERIAL NUMBER: [    ]    LAST NAME: [    ]
COMPUTER NAME: [    ]
MODEL:
NUMBER OF RECORDS: [20 ▾]
🔍 SEARCH ASSET

| BUSINESS | DISKUUID | FULLNAME | IP ADDRESS | MODEL | NAME | SERIAL NUMBER | OWNER SSO | SUB BUSINESS | USERNAME |
|---|---|---|---|---|---|---|---|---|---|
| AVIATION | UUID FOR TESTING | | 1.3.3.7 | MAC | SANJEEV TEST | | | ATO | SANJEEV |
| AVIATION | | | 1.3.3.7 | IMAC12.1 | | | | GIS (ONLY) | |
| AVIATION | | | 1.3.3.7 | MAC | SANJEEV TEST | | | ATO | SANJEEV |
| AVIATION | | | 1.3.3.7 | MAC | SANJEEV TEST | | | ATO | SANJEEV |
| AVIATION | | SOME USER | 1.2.3.4.5.6 | TEST MODEL | TEST NAME | | | TEST SUB-BUSINESS | TEST USERNAME |

TOTAL RECORDS 5                    PAGE 1/1

ENTERPRISE ENVIRONMENT DISK ENCRYPTION

BACKGROUND

An enterprise computing environment uses network connected computers (e.g., a personal computer, a workstation, a thin client computer, etc.) to provide end users with tools for the modern office. Some network connectable computers include a resident encryption module as part of the built-in, or installed software provided with the computer. The resident encryption module performs a consumer-orientated disk encryption implemented during setup of the computer.

The resident encryption module can provide storage of the user's encryption key on a server designated by the operating system's provider. For example, Apple's Mac OS X Lion operating system (Apple, Inc., Cupertino, Calif.) includes a resident encryption module branded FileVault 2 that provides such an option. The encryption key can be retrieved over the phone by providing specific personal information. The encryption retrieval process is available to enable a user to access their personal data in the event of a forgotten operating system username and password.

Storing a disk encryption password on a server outside of the enterprise computing environment and control does not meet the high standard security protocol implemented by the enterprise itself. Further, retrieval of the encryption key via a telephone call by providing personal information also does not meet enterprise security protocol.

BRIEF DESCRIPTION OF THE DRAWINGS

FIG. 6 depicts a user interface in accordance with an embodiment of the invention.

DETAILED DESCRIPTION

A system and method embodying the present invention can provide enterprise management capabilities of a full-disk encryption solution for a client computer connected to the enterprise's computer system. The solution can include portions that interact over an electronic communication network to create, set, store and make available a disk password that can be used to unlock an encrypted disk drive coupled to the client computer.

Controlled availability to these disk passwords by the enterprise can facilitate forensic analysis and give enterprise support personnel access to the encrypted disk and its data. To conform with enterprise security protocol, an encrypted device should have an enforced process by which forensic data analysis may be performed outside of user consent and on a per-machine basis. There also should be an enforced process by which a user can regain access to their encrypted device in the event of a forgotten password. Further, a key or password that unlocks an encrypted device must be capable of being modified (could be either on an interval or on-demand).

Enterprise security protocol could require a Pre-Boot Authentication, and that the performance of the client computer be minimally impacted. Further, sophisticated enterprise security protocols require that some of these solutions modify the Boot EFI code not be modified. Modifying the Boot EFI could result in data on these devices being rendered irretrievable if specific, critical operating system security updates are installed without first decrypting the device. Solutions that are not implemented this way sacrifice pre-boot authentication, and as a result, rely solely on authentication methods that are known to be exploitable.

Figure 1:
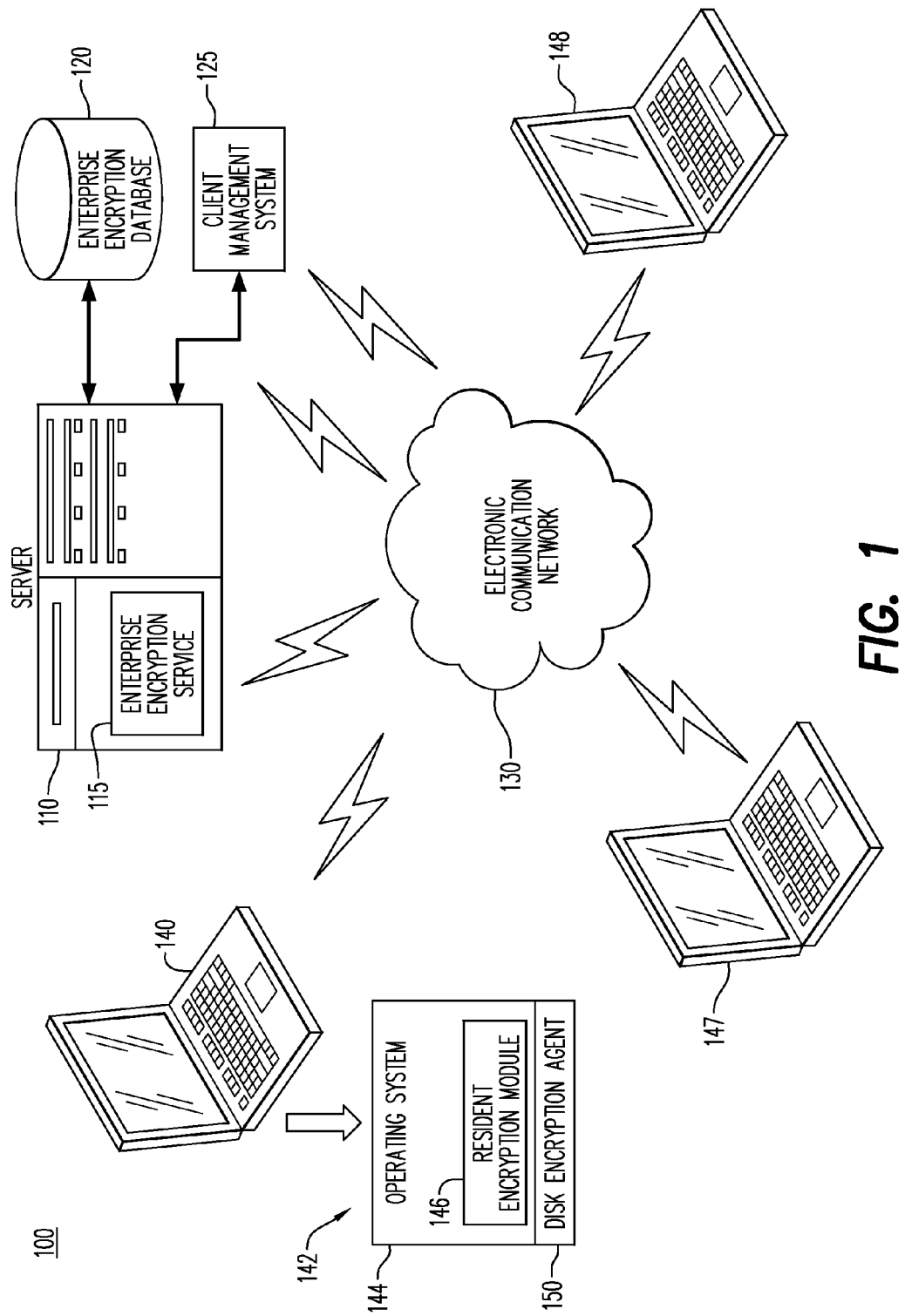
FIG. 1 depicts a system in accordance with an embodiment of the invention.

FIG. 1 depicts an enterprise computer system 100 in accordance with an embodiment of the invention. System 100 includes server 110 that is in communication with enterprise encryption database 120 and client management system 125. The enterprise encryption database can be an object-relational database management system, a relational database management system, or any other database management system. Client management system 125 can include, but is not limited to, a control processor, a data store, an I/O port and interface, an internal memory that can contain operating instructions (e.g., executable code) that can configure the control processor to perfrom the control processes for implementing the client management system, and an internal bus interconnecting these elements.

Communication between the server, the enterprise encryption database, and the client management system can be either over electronic communication network 130, or a dedicated communication path. Electronic communication network 130 can be the Internet, a local area network, a wide area network, a virtual private network, a wireless area network, or any other suitable configuration of an electronic communication network.

Server 110 includes at least one control processor that is configured to support operation of enterprise encryption service 115 by executing executable instructions accessible by the control processor. Dedicated hardware, software modules, and/or firmware can implement enterprise encryption service 115.

Connected to server 110 via electronic communication network 130 are one or more client computers 140, 147, 148. The client computers can be any type of computing device suitable for use by an end user in performance of the end user's function for the enterprise (e.g., a personal computer, a workstation, a thin client, a netbook, a notebook, tablet computer, etc.). The client computer can be coupled to a disk drive (internal and/or external). The disk drive technology may be any type of non-volatile mass storage memory technology (e.g., flash drives, hard disk drives, optical disc drives, magneto-optical disc drives, holographic, bubble, etc.)

Representatively illustrated with regard to client computer 140 is a portion of the client computer's software suite 142. The software suite includes operating system 144 which can include a built-in resident encryption module 146. The resident encryption module need not be built-in to operating system 144, but can be a separate software module that operates in conjunction with operating system 144. Thus, resident encryption module 146 need only be resident on the client computer.

Figure 2:
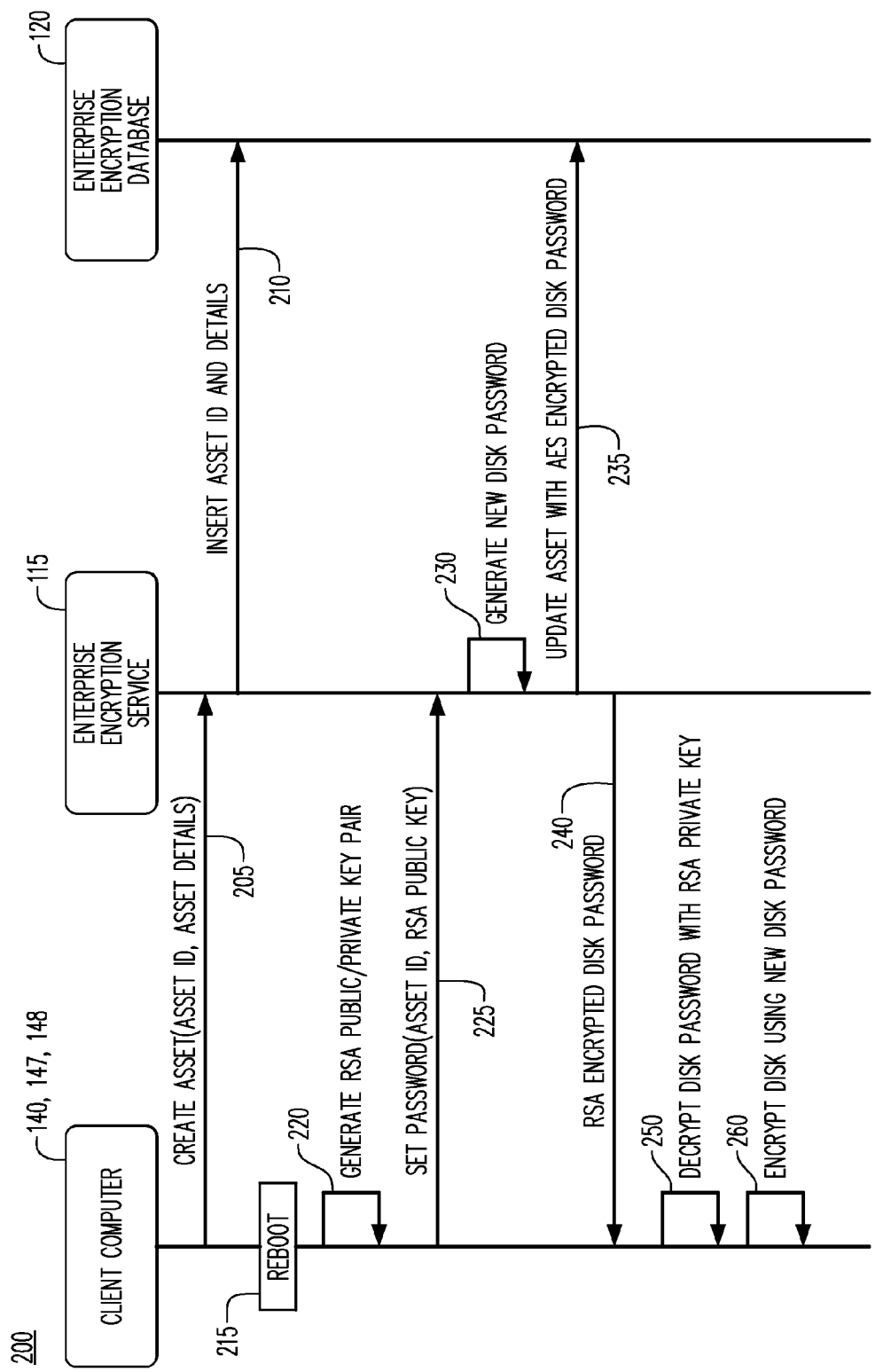
FIG. 2 depicts a process in accordance with an embodiment of the invention.

FIG. 2 depicts process 200 in accordance with an embodiment of the invention. Process 200 depicts steps in a multi-part installation routine that can be performed in phases by one client computer 140, 147, 148, enterprise encryption service 115, and enterprise encryption database 120. For purposes of process 200, the user is understood to be an end user, an enterprise IT staff member, or any other person. During a first phase of process 200, the process harvests user and computer information and then initiates full disk encryption by resident encryption module 146. The disk is then locked with an easy, temporary password that is provided to the user. As the user progresses through the installation routine they utilize this temporary password to login after restarting their client computer. During another phase of process 200, enterprise encryption service 115 located on server 110 generates a unique, complex password. This password is securely transmitted to the client computer and set as the new disk password (unknown to the user). During this time, the disk password is also stored in enterprise encryption database 120 and associated in a data record with both the client computer and it's end user assigned by the enterprise. In one implementation, the disk password can be stored in an encrypted format in the enterprise encryption database. After the full disk encryption configuration process is complete the user is prompted to click a "complete" radio button displayed on the client computer. The computer will continue to encrypt the disk in the background.

Prior to beginning process 200, disk encryption agent 150 (FIG. 1) is downloaded from server 110 to the client computer. The disk encryption agent can be in communication with enterprise encryption service 115 via electronic communication network 130. Also, a local user identity has been associated with the client computer through the use of flag files.

Client computer identification information (e.g., asset identifier and asset details) is sent, step 205, to enterprise encryption service 115. This identification information can include a token that is stored in a data store portion of client management system 125 and also deployed (in an obfuscated form) to the client. The token is optional part of the enterprise security protocol to identify assets in the enterprise computer system.

The client application runs a routine to obtain a list of media access control (MAC) addresses associate with the client computer. System information is also read and from the user identity flags a file is generated. An XML example of the file is shown:

```
<?xml version="1.0" encoding="UTF-* standalone="no"?>
<Asset>
<business>Bus</business>
<diskuuid>temp</diskuid>
<fullname>Full Name</fullname>
<ipaddress>1.2.3.8</ipaddress>
<,macaddress>06.2c.cb.d4.d7.de</macaddress>
<model>typ</model>
<name>Test</name>
<serial>521-FQB-532</serial>
<sso>124356789</sso>
<subbusiness>All</subbusiness>
<token>123456789123</token>
<username>firstlast</username>
<Asset>
```

The file is sent to the enterprise encryption service, where a CreateAsset service verifies the identity of the call by checking the token/MAC address combination against information stored in the client management system.

After the identity is verified, an "asset" entry is made in an asset list table within enterprise encryption database, step 210. Also, client logs can be written to the database and associated with this asset by sending a file (e.g., the following XML file):

```
<?xml version="1.0" encoding="UTF-8" standalone="no"?>
<installerLog>
<installerversion>v0.1</installerversion>
<macaddress>06.2c.cb.d4.d7.de </macaddress>
<message>Encrypting passphrase with . . . </message>
<operator>123456789</operator>
<serial>521-FQB-532</serial>
<token>123456789123</token>
</installerLog>
```

Once this asset has been created, the following shell command is run: echo \"12345\"|diskutil cs convert disk0s2-stdinpassphrase. This stages the full disk encryption to be run by resident encryption module 146 resident on the client computer, and initializes a temporary disk password of "12345." The disk UUID (universal unique identifier) is obtained from the output of this command, and written to a flag file on the client computer for possible later use.

Also, a prompt is displayed on the client computer that instructs the user to reboot the computer, step 215. Upon reboot, the client computer prompts the user for the temporary password. After logging in to the client computer, disk encryption agent 150 launches. At this point resident encryption module 146 has already began to encrypt the disk in the background.

A routine in the disk encryption agent executes to obtain a list of the MAC addresses associated with the client computer. Disk encryption agent 150 generates a Public/Private key pair locally on the Mac. Further, system information and user identity flag files are read and combined with the generated public key to form a file (e.g., the following XML file):

```
<?xml version="1.0" encoding="UTF-8" standalone="no"?>
<password>
<installerversion>v1.0</installerversion>
<macaddress>06.2c.cb.d4.d7.de </macaddress>
<operator>123456789</operator>
<publickey>MIICIjANBgkqhkiG9w0BAQEF . . . AgEA5wVi . . .
</publickey>
<serial>521-FQB-532</serial>
<token>123456789123</token>
<diskuuid>234KBS-234HHH-33425GDF-EDDF2</diskuuid>
<value/>
</password>
```

This file is sent to a SetPassword service, step 235, where the identity of the call is verified by checking the token/MAC address combination against information in client management system 120. If the identity is verified, a random alpha-numeric disk password is generated by enterprise encryption service 115, step 230.

This disk password is encrypted and stored, step 235, in the enterprise encryption database record(s) associated with the asset. Also the disk password is then separately encrypted with a public key generated (step 220) by the client computer (and sent to the enterprise encryption service at step 225), and returned to the client computer, step 240.

The client computer receives the encrypted disk password and uses the local private key to decrypt it at step 250. Once the client has the decrypted disk password, the following shell command is run: echo diskpassword|diskutil cs changeVolumePassphrase diskUUID-oldpassphrase 12345-stdinpassphrase. This command sets the current disk password to be the random, alpha-numeric string, and the temporary password no longer works. The disk is then encrypted using the new disk password, step 260.

At this stage, a few steps guide the user to manually enable login to the encrypted disc. A series of user interfaces are displayed at the client computer to instruct the user on how to accomplish this login to the encrypted disc. These simple modifications can be made manually in order to give the local user account the ability to login to the encrypted disk. The modifications include changes to preferences for resident encryption module 146. For example, in one embodiment, local MAC credentials need to be provided; and a pre-boot login can be configured.

After these steps are completed, disk encryption agent 150 deletes files created on the client computer in support of this process, and the agent itself is deleted so that it cannot run at the next start-up cycle.

Figure 3:
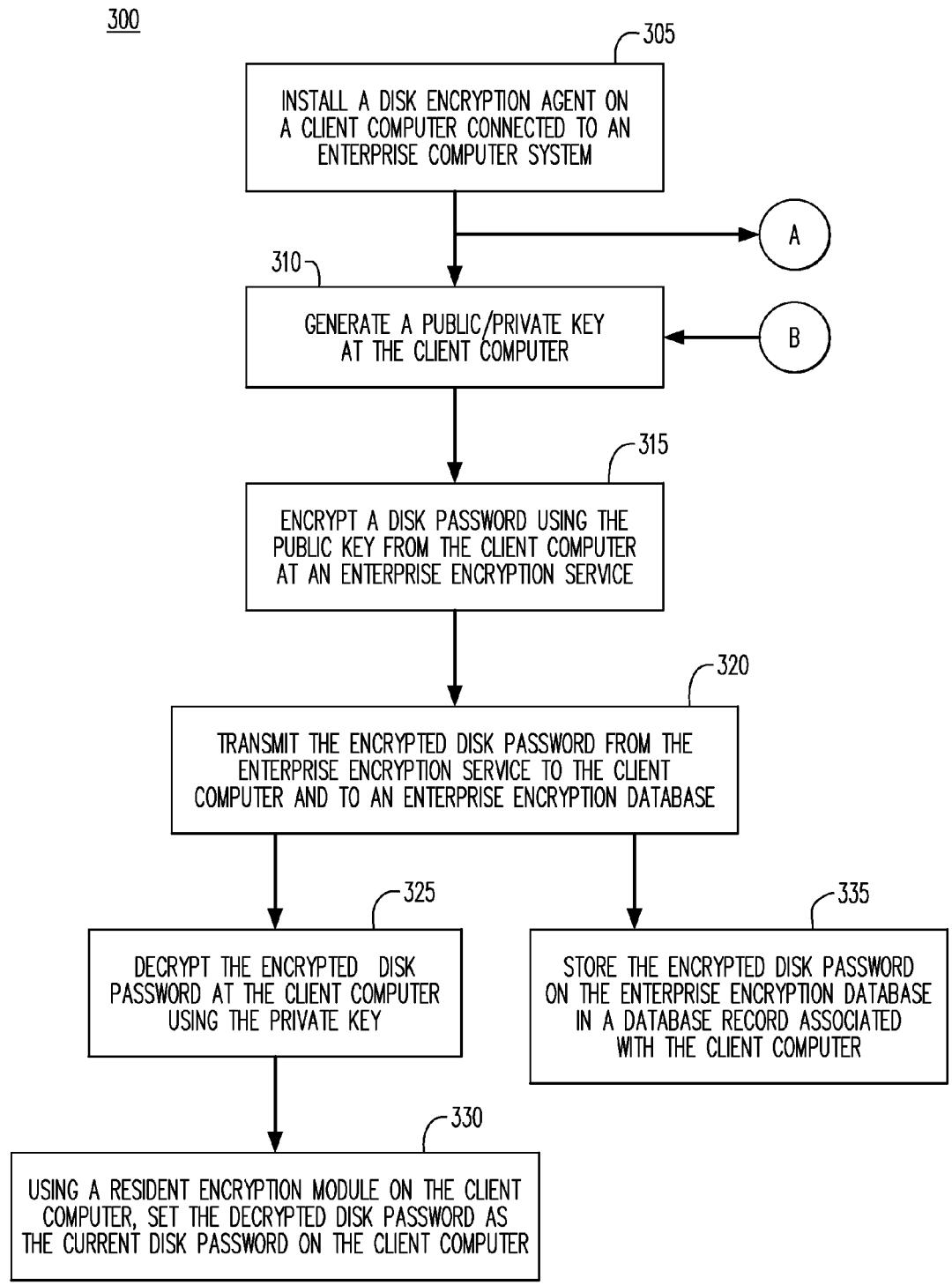
FIG. 3 depicts a portion of the process depicted in FIG. 2.

FIG. 3 depicts process 300 in accordance with an embodiment of the invention. Process 300 is a portion of process 200 described above. At step 305, disk encryption agent 150 is installed on a client computer (e.g., client computer 140, 146, 148) connected to enterprise encryption system 115. Before proceeding to step 310, process 200 can optionally flow as depicted by flow bubble A. This optional flow is described below.

The client computer generates a public/private key, step 310. The public key, along with identifying information is transmitted to the enterprise encryption service, as was described above with regard to FIG. 2, step 225. At step 315, enterprise encryption service 115 encrypts a disk password using the public key generated at the client computer. The disk password can be a random, alphanumeric password.

The encrypted disk password is transmitted, step 320, to the client computer and to enterprise encryption database 120. The client computer decrypts, step 325, the encrypted disk password using the private key. Using the decrypted disk password, resident encryption module 146 sets, step 330, the decrypted disk password as the current disk password on the client computer. At the enterprise encryption database, the encrypted disk password is stored, step 335, in a record associated with the client computer.

Figure 4:
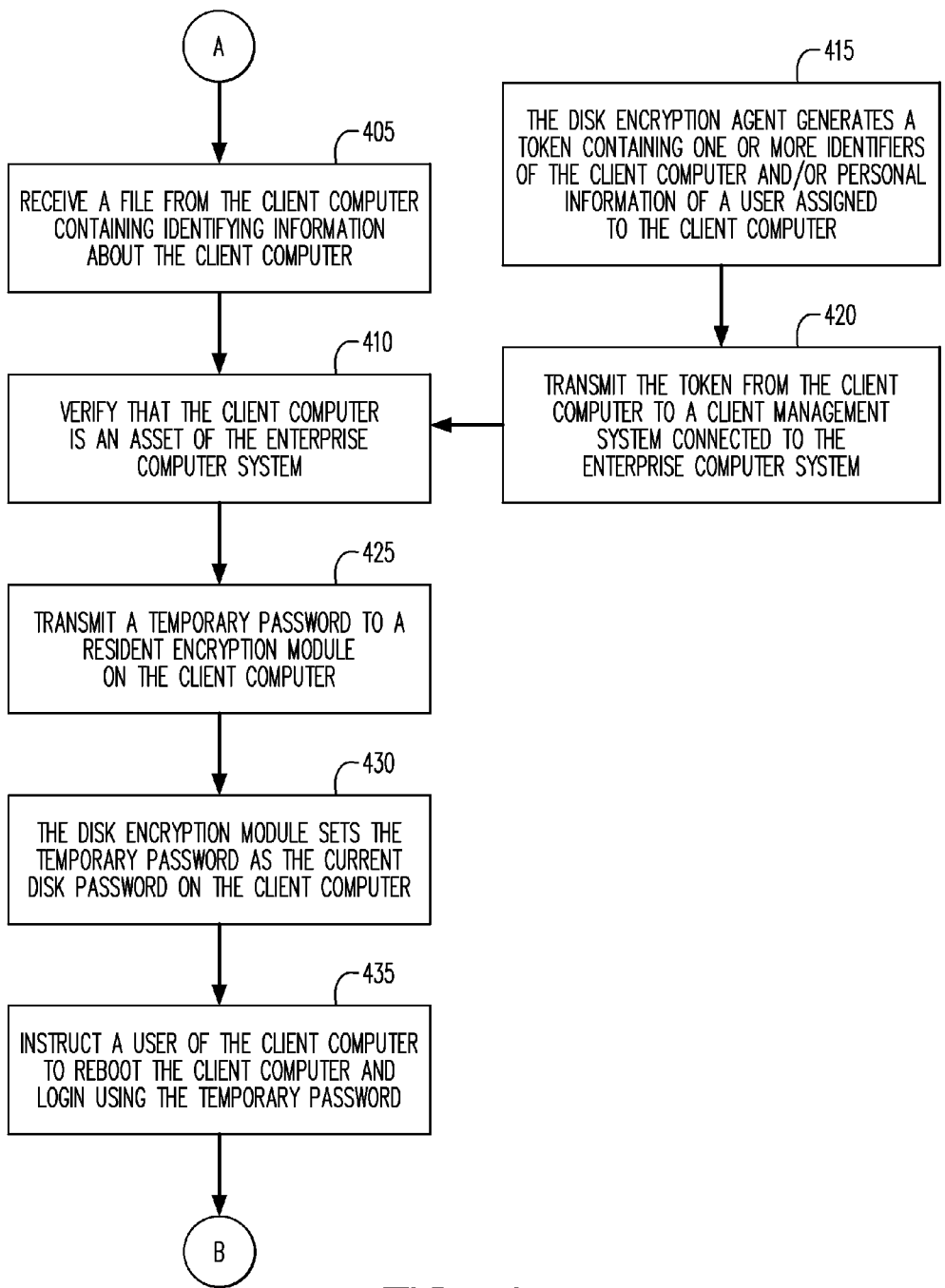
FIG. 4 depicts another portion of the process depicted in FIG. 2.

FIG. 4 depicts process 400 in accordance with an embodiment of the invention. Process 400 is a further portion of process 200 described above. Enterprise encryption service 115 receives, step 405, a file from the client computer containing identifying information about the client computer. By comparing data record(s) within a data store portion of client management system 125, enterprise encryption service 115 can verify, step 410, that the client computer is an asset that is part of the enterprise computer system.

In a separate flow, and prior to the verification step, the disk encryption agent installed on the client computer generates a token, step 415, containing one or more identifiers of the client computer and/or personal information of a user (e.g., an end user) assigned to the client computer. At step 420, the token is transmitted to client management system 125 over either electronic communication network 130 or a dedicated communication path. The information within the token can be used during the verification process of step 410.

At step 425, the encryption enterprise system transmits a temporary password to a resident encryption module resident on the client computer. The resident encryption module sets, step 430, the temporary password as the current disk password for the client computer. The user of the client computer is then presented with user interface display(s) that instruct the user, step 435, to reboot the client computer and then sign in using the temporary password.

Transparent to the end-user a hidden support account can be created on the client computer to hold the same password as the decrypted disk password. This hidden support account is used in the event the user forgets their local account password and cannot login to the encrypted disk.

The Disk Password Reset (DPR) tool is an application that can be deployed to or run on a client computer that has been configured with full disk encryption by the enterprise encryption service. The DPR application runs silently as a background process and changes the disk password on the client computer.

The DPR tool sends a request to client management system 125 to generate a token. The token is stored in the client management system and also deployed (in an obfuscated form) to the client. The DPR tool runs a routine to obtain a list of the MAC addresses associated with the client computer. Locally, on the client computer a public/private key pair is generated. System information and user identity flag files are read and combined with the public key to form a file (e.g., the following XML file):

```
<?xml version="1.0" encoding="UTF-8" standalone="yes"?>
<getCurrentPasswordRequest>
    <assetKey>
        <serialNumber>521-FQB-532</serialNumber>
    </assetKey>
    <macAddress>xx:xx:xx:xx:xx</macAddress>
    <token>123456789123</token>
    <rsaPublicKey>-----BEGIN PUBLIC KEY-----
MIICIjANBgkqhkiG9w0BAQEF . . . AgEA5wVi-----END PUBLIC KEY-
    </rsaPublicKey>
</getCurrentPasswordRequest>
```

A call is made by the DPR to a getCurrentPassword service in the enterprise encryption service, which verifies the identity of the call by checking the token/Mac Address combination against the client management system.

```
<?xml version="1.0" encoding="UTF-8" standalone="no"?>
<installerLog>
    <installerversion>v0.1</installerversion>
    <macaddress>06.2c.cb.d4.d7.de </macaddress>
    <message>Encrypting passphrase with . . . </message>
    <operator>123456789</operator>
    <serial>521-FQB-532</serial>
    <token>123456789123</token>
</installerLog>
```

If the identity is verified, the current disk password is encrypted using the public key and returned to the DPR tool. Once the current disk password has been retrieved, system information and user identity flag files are once again combined with the public key that has been generated to form a file (e.g., the following XML file):

```
<?xml version="1.0" encoding="UTF-8" standalone="no"?>
<password>
    <installerversion>v1.0</installerversion>
    <macaddress>06.2c.cb.d4.d7.de </macaddress>
    <operator>123456789</operator>
    <publickey> MIICIjANBgkqhkiG9w0BAQEF . . . AgEA5wVi
    </publickey>
    <serial>521-FQB-532</serial>
    <token>123456789123</token>
    <diskuuid>234SDG-234JJJ-34325GDF-DFDF3</diskuuid>
    <value/>
</password>
```

This file is sent to the SetPassword service of the enterprise encryption service and the service verifies the identity of the call by checking the token/Mac Address combination against the records of the client management system. If the identity is verified, a random, alpha-numeric disk password is generated by the enterprise encryption service. This disk password is encrypted and stored in enterprise encryption database 120, where it is associated to the asset that was created as described above with regard to process 200. The disk password is also then separately encrypted with the public key that was sent to the enterprise encryption service, and returned to the client computer. The client computer uses the local private key to decrypt the encrypted password. Now that the DPR tool has both the current and new disk password, the following shell command: echo newDiskPassword|diskutil cs changeVolumePassphrase diskUUID-oldpassphrase currentDiskPassword.

Depending on whether the disk password change is successful, a flag file is written to indicate success or failure of the change. This flag file is reported in to the client management system for tracking.

Figure 5:
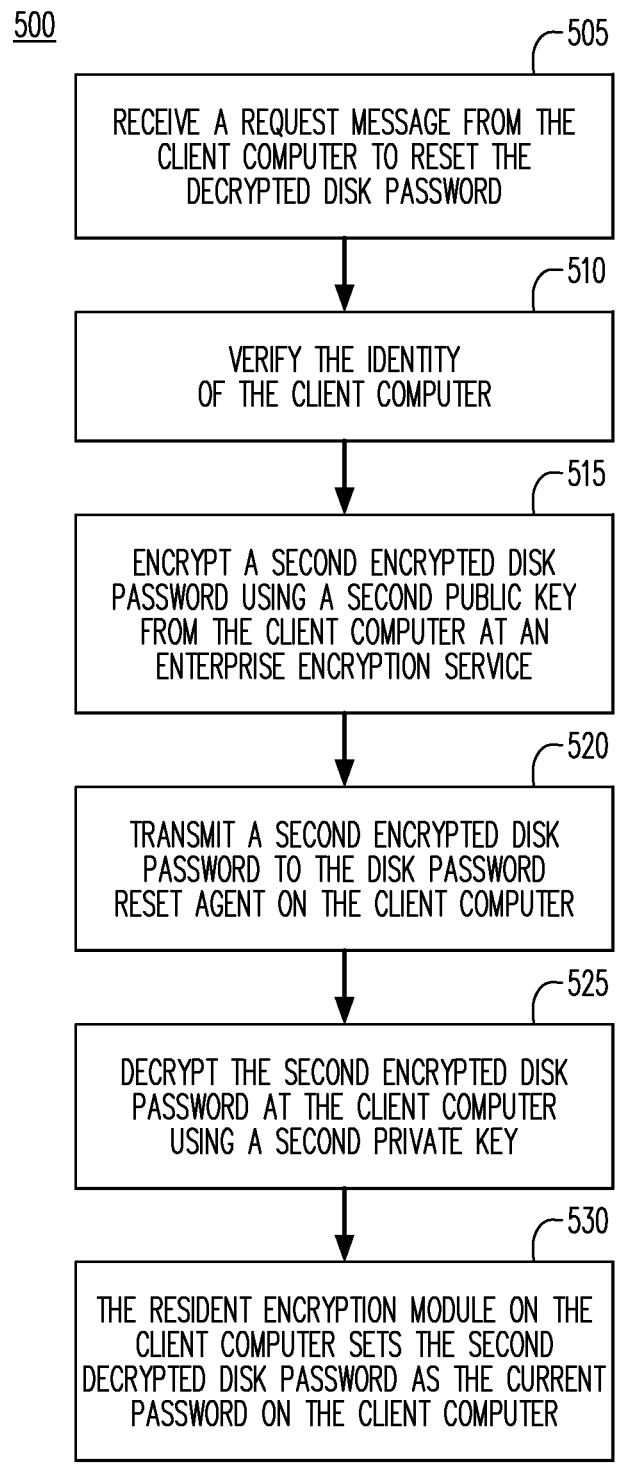
FIG. 5 depicts a process in accordance with an embodiment of the invention.

FIG. 5 depicts process 500 that implements the DPR in accordance with an embodiment of the invention. At step 505, the enterprise encryption service can receive a request message from a client computer to reset its disk password. The identity of the client computer is verified, step 510, by comparing data records for the asset with records within a data store portion of client management system 125 and identifying information sent from the client computer. If verification is successful, a new encrypted disk password is generated, step 515, by the enterprise encryption service using a public key sent from the requesting client computer. This encrypted disk password is transmitted, step 520, to a disk password agent on the client computer. The transmitted password is decrypted, step 525, using the private key. The resident encryption module resident on the client computer sets, step 530, the decrypted disk password as the current disk password.

FIG. 6 depicts a user interface for a web service admin console 600 in accordance with an embodiment of the invention. The web service facilitates the communication between enterprise encryption service 115, admin console 600, and enterprise encryption database 120. Each time either the enterprise encryption service or the admin console needs to read or write data, it can do so through a web service. In this way, the design is modular enough to support open interaction with other systems via http(s).

A secure html/java based web application grants administrators access to stored disk passwords based on their credentials. The robust set of controls available through Groups and Permissions allow assignment of varying levels of access to specific groups of any number of support groups or individual support personnel.

For example, the admin console includes application menu 605, where an administrator can select particular actions to be performed (e.g., manage users, manage groups, assign users, assign permissions, etc.). Admin console 600 can be used to access disk passwords stored in enterprise encryption database 120 for support purposes—data recovery, forensics, forgotten passwords, user lock out, etc.

Display area 610 of the admin console 600 can be an interactive user interface. Changes made within console 600 can be loaded into the enterprise encryption database to make corresponding changes to one or more data records.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for deploying a disk encryption password on an enterprise computer system in accordance with an embodiment of the invention.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method for deploying a disk encryption password on an enterprise computer system, the method comprising:
   causing the installation of a disk encryption agent on a client computer of the enterprise computer system, the disk encryption agent being in communication with an enterprise encryption service;
   encrypting, at the enterprise encryption service, a disk password generated at the enterprise encryption service, the encrypted disk password being encrypted using a public key of a public/private key pair generated by the disk encrytion agent at the client computer;
   transmitting the encrypted disk password to the disk encryption agent on the client computer; and
   encrypting a disk of the enterprise computer system using the encrypted disk password.

2. The method of claim 1, further including the steps of:
   causing the encrypted disk password to be decrypted at the client computer using the private key; and
   causing the decrypted disk password to be set as a current disk password on the client computer.

3. The method of claim 2, further including the step of causing instructions to be provided to a user of the client computer to manually enable login to the encrypted disk.

4. The method of claim 2, further including the steps of:
   receiving a request message from the client computer to reset the decrypted disk password, the request message including a second public key of a second public/private key generated at the client computer;
   verifying the identity of the client computer by comparing information within the request message with a record on a client management system that is in communication with the enterprise encryption service;
   encrypting, at the enterprise encryption service, a second disk password generated at the enterprise encryption service, the second encrypted disk password being encrypted using the second public key; and
   transmitting the second encrypted disk password to a disk password reset agent on the client computer
   decrypting the second encrypted disk password at the client computer using the second private key; and setting the second decrypted disk password to be a current disk password on the client computer.

5. The method of claim 1, further including the step of storing the encrypted disk password on a client management database that is in communication with the enterprise encryption service.

6. The method of claim 1, further including the steps of:
receiving, at the enterprise encryption service, a file generated at the client computer, the file containing identifying information of the client computer and a public key of a public/private key pair generated at the client computer; and
prior to the encrypting step, verifying the identity of the client computer by comparing the contents of the file with asset-identifying records on a client management system that is in communication with the enterprise encryption service.

7. The method of claim 1, wherein prior to the encrypting step, the method further includes the steps of:
receiving, at the enterprise encryption service, a file generated at the client computer, the file including identifying information of the client computer;
verifying the identity of the client computer as an asset of the enterprise computer system;
transmitting a temporary password to a resident encryption module on the client computer;
causing the temporary password to be set as a current disk password on the client computer; and
causing a user to be instructed to reboot the client computer and login using the temporary password.

8. The method of claim 7, wherein the verifying step includes comparing the contents of the file with asset-identifying records on a client management system that is in communication with the enterprise encryption service.

9. The method of claim 7, further including the steps of:
requesting the disk encryption agent to generate a token, the token containing at least one of one or more identifiers of the client computer and personal information of a user assigned to the client computer; and
storing the token in a client management system that is in communication with the enterprise encryption service.

10. The method of claim 9, wherein the identifying information includes at least a portion of the token contents.

11. The method of claim 1, further including the step of causing the client computer to delete the disk encryption agent.

12. A method for installing a disk encryption password on a client computer, the method comprising the steps of:
decrypting an encrypted disk password at the client computer, the encrypted disk password having been created from a disk password generated at and transferred from a remote device and encrypted at the remote device using a public key of a public/private key pair generated by a disk encryption agent at the client computer;
setting the decrypted disk password to be a current disk password on the client computer; and
performing manual modification of at least one login protocol so as to enable access to the encrypted disk.

13. A non-transitory computer readable medium having stored thereon instructions which when executed by a processor cause the processor to perform the method of:
causing the installation of a disk encryption agent on a client computer of an enterprise computer system, the disk encryption agent being in communication with an enterprise encryption service;
encrypting, at the enterprise encryption service, a disk password generated at the enterprise encryption service, the encrypted disk password being encrypted using a public key of a public/private key pair generated by the disk encryption agent at the client computer;
transmitting the encrypted disk password to the disk encryption agent on the client computer; and
encrypting a disk of the enterprise computer system using the encrypted disk password.

14. The computer readable medium of claim 13, further including executable instructions to cause a processor to perform the steps of:
causing the decryption of the encrypted disk password at the client computer using the private key;
causing the decrypted disk password to be set as a current disk password on the client computer; and
causing instructions to be provided to a user of the client computer to manually enable login to an encrypted disk.

15. The computer readable medium of claim 13, further including executable instructions to cause a processor to perform the step of storing the encrypted disk password on a enterprise encryption database that is in communication with the enterprise encryption service.

16. The computer readable medium of claim 13, further including executable instructions to cause a processor to perform the steps of:
receiving, at the enterprise encryption service, a file generated at the client computer, the file containing identifying information of the client computer and a public key of a public/private key pair generated at the client computer; and
prior to the encrypting step, verifying the identity of the client computer by comparing the contents of the file with asset-identifying records on a client management system that is in communication with the enterprise encryption service.

17. The computer readable medium of claim 13, further including executable instructions to cause a processor to perform the steps of:
receiving, at the enterprise encryption service, a file generated at the client computer, the file including identifying information of the client computer;
verifying the identity of the client computer as an asset of the enterprise computer system;
transmitting a temporary password to a resident encryption module on the client computer;
setting the temporary password to be a current disk password on the client computer; and
instructing a user to reboot the client computer and login using the temporary password.

18. A system comprising:
a distributed computing system including one or more client computers connected to an electronic network;
at least one server connected to the electronic network and having a control processor configured to support operation of an enterprise encryption service, the enterprise encryption service capable of installing a disk encryption agent on at least one client computer, generating an encrypted disk password using a public key of a public/private key pair generated by the disk encrytion agent at the at least one client computer, and transmitting the encrypted disk password to the at least one client computer; wherein the encrypted disk password is configured to enable access an encrypted disk of the at least one client computer;
an enterprise encryption database that is in communication with the enterprise encryption service via at least one of the electronic communication network and a dedicated connection; and a client management system that is in communication with the enterprise encryption service via at least one of the electronic communication network and a dedicated connection.

19. The system of claim 18, further including:

the at least one client computer including a resident encryption module;

the control processor further configured to transmit the encrypted disk password to the client computer so the a disk connected to the at least one client computer is encrypted by the resident encryption module using the encrypted disk password.

20. The system of claim 18, further including a web service administration console having a modular design configured to support open interaction between the web service administration console and at least one of the enterprise encryption service and the client management database during data operations.

* * * * *